(Model.)
A. A. WILCOX.
HAND PIECE FOR DENTAL ENGINES.
No. 391,349. Patented Oct. 16, 1888.
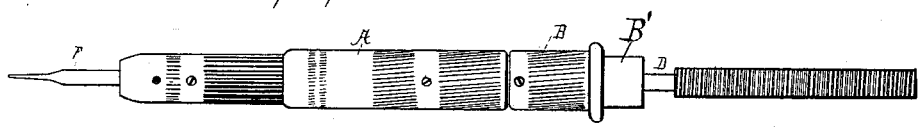
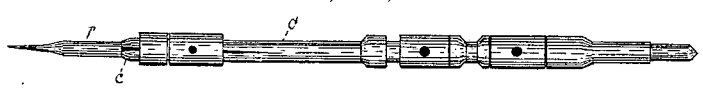
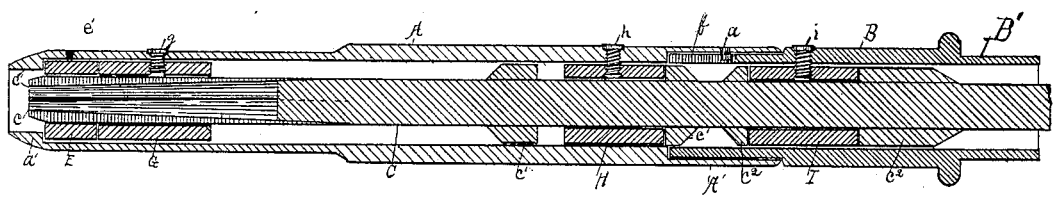
WITNESSES
B. S. Lowrie,
Geo. W. King
Amos A. Wilcox INVENTOR.
By Leggett & Leggett
Attorney.

United States Patent Office.

AMOS A. WILCOX, OF CLEVELAND, OHIO.

HAND-PIECE FOR DENTAL ENGINES.

SPECIFICATION forming part of Letters Patent No. 391,349, dated October 16, 1888.

Application filed December 2, 1887. Serial No. 256,789. (Model.)

*To all whom it may concern:*

Be it known that I, AMOS A. WILCOX, of Cleveland, in the county of Cuyahoga and State of Ohio, have invented certain new and useful Improvements in Hand-Pieces for Dental Engines; and I do hereby declare the following to be a full, clear, and exact description of the invention, such as will enable others skilled in the art to which it pertains to make and use the same.

My invention relates to improvements in hand-piece and chuck for dental engines; and it consists in certain features of construction and in combination of parts hereinafter described, and pointed out in the claims.

In the drawings, Figure 1 is a plan. Fig. 2 is a plan of the spindle detached from the casing. Fig. 3 is an enlarged elevation in longitudinal section through the center of the device.

The casing is made in two sections, A and B. The main or primary section A has an enlarged bore, A', at the rear end thereof, into which the reduced forward end of secondary section B enters with an easy fit, so that the latter may move a short distance endwise in operating the chuck. A pin or screw, $a$, of section A, operating in a slot, $b$, of section B, prevents the latter from turning in its seat.

C is a spindle that operates inside the casing and to the rear end of which is attached a flexible shaft, D, for driving the spindle. The forward end of the spindle serves as a chuck, having a longitudinal central bore, C', for receiving the shanks of different tools F, and having longitudial slits $c$ opening into bore C' for expanding and reducing the ends of the spindle. For grasping or releasing the tool the external surface of the spindle, wherein it fits sleeve E, is slightly conical, decreasing in size rearward. Sleeve E has an easy fit inside the casing, so that it may revolve freely therein, the sleeve being held endwise between shoulder $a'$ of the casing and collar G, the latter being secured to the casing by screw $g$. An oil-hole, $e'$ is provided for lubricating the sleeve E and its bearing. Sleeve H fits snugly inside the casing, and is rigidly secured to section A by screw $h$. This sleeve has an easy fit on the spindle, so that the latter may revolve therein and slide endwise as far as shoulders $c'$ will admit. Sleeve I fits snugly inside section B of the casing, to which it is secured by screw $i$. This sleeve has an easy fit on the spindle, and is held from moving endwise on the spindle by shoulders $c^2$. The different shoulders $c'$ $c^2$ are formed by bands shrunk, soldered, or otherwise secured to the spindle after sleeves H and I are in position on the spindle. By means of sleeve I and shoulders $c^2$ the spindle is made to move endwise with the end movement of section B, and by moving the spindle endwise through sleeve E the chuck is operated, the forward movement of the spindle loosening the chuck. When the spindle is drawn rearward to tighten the chuck, the spindle firmly engages sleeve E, and the sleeve and spindle revolve together, thus forming a journal-bearing as between the sleeve and casing, so close to the end of the spindle as to prevent vibration of the chuck and tools. When the chuck is loosened, the spindle is loose in sleeve E, in which case the sleeve may revolve in the casing or the spindle may revolve in the sleeve, or partly both.

An elastic casing, not shown, fits on the reduced end B' of section B for inclosing the flexible shaft, such flexible casing and flexible shaft being well known for such purpose.

In operating the device section B may be moved forward to open the chuck, the one tool removed and another tool inserted in the chuck and section B drawn back to tighten the chuck, all of which may be done while the spindle is running at full speed, the fingers of the operator being sufficient to manipulate section B.

What I claim is—

1. The combination, with a casing composed of primary and movable sections united by means of a slip-joint, of a chuck-spindle having shoulders thereon, a sleeve attached to the primary section of the casing for limiting the endwise movement of the spindle, and a loose sleeve forming an end bearing for the spindle, the said sleeve being free to rotate, but confined against lateral movement, substantially as set forth.

2. The combination, with hand-piece consisting of primary and movable sections having a slip-joint at their union, a pin and slot at the slip-joint for holding the parts from turning one on the other, substantially as indicated, of chuck-spindle operating in such hand-piece, a sleeve journaled without end-play in the primary section of the hand-piece, said spindle having end-play through such sleeve in tightening and loosening the chuck, the spindle being held and moved endwise by its engagement with the movable section of the hand-piece, substantially as set forth.

In testimony whereof I sign this specification, in the presence of two witnesses, this 24th day of October, 1887.

AMOS A. WILCOX.

Witnesses:
  CHAS. H. DORER,
  ALBERT E. LYNCH.